(12) United States Patent
LeBlanc et al.

(10) Patent No.: US 8,904,822 B2
(45) Date of Patent: Dec. 9, 2014

(54) THICKNESS CONTROL OF SUBSTRATES

(71) Applicants: Philip Robert LeBlanc, Corning, NY (US); Correy Robert Ustanik, Painted Post, NY (US)

(72) Inventors: Philip Robert LeBlanc, Corning, NY (US); Correy Robert Ustanik, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 86 days.

(21) Appl. No.: 13/669,994

(22) Filed: Nov. 6, 2012

(65) Prior Publication Data

US 2014/0123703 A1 May 8, 2014

(51) Int. Cl.
C03B 17/06 (2006.01)
C03B 18/04 (2006.01)

(52) U.S. Cl.
USPC ............ 65/29.21; 65/29.19; 65/29.1; 65/53; 65/98; 65/195; 65/162

(58) Field of Classification Search
CPC .. C03B 17/064; C03B 17/067; C03B 17/065; C03B 17/06; C03B 21/02; C03B 29/00; C03B 29/14; C03B 29/16; C03B 18/00–18/22; C03B 17/00–17/068; C03B 15/00–15/18
USPC ......... 65/29.21, 29.19, 29.1, 53, 98, 195, 162
See application file for complete search history.

(56) References Cited

U.S. PATENT DOCUMENTS

| 3,694,181 | A | * | 9/1972 | Dear ............................. 65/158 |
| 5,604,635 | A | * | 2/1997 | Lawandy ..................... 359/620 |
| 5,665,136 | A | * | 9/1997 | Komachi ....................... 65/102 |
| 5,737,126 | A | * | 4/1998 | Lawandy ..................... 359/620 |
| 5,742,026 | A | * | 4/1998 | Dickinson et al. ........ 219/121.69 |
| 5,768,022 | A | * | 6/1998 | Lawandy ..................... 359/620 |
| 5,978,189 | A | * | 11/1999 | Habu ............................ 360/135 |
| 6,502,423 | B1 | * | 1/2003 | Ostendarp et al. ........... 65/29.14 |
| 7,152,434 | B2 | * | 12/2006 | Hashimoto et al. ............. 65/392 |
| 7,920,257 | B2 | * | 4/2011 | An et al. .................... 356/239.1 |
| 8,109,118 | B2 | * | 2/2012 | Watanabe et al. ............ 65/134.9 |
| 8,225,627 | B2 | * | 7/2012 | Kuroiwa et al. .................. 65/28 |
| 8,291,729 | B2 | * | 10/2012 | Grzybowski et al. ......... 65/33.5 |
| 8,459,062 | B2 | * | 6/2013 | Ahrens et al. .................. 65/195 |
| 8,677,783 | B2 | * | 3/2014 | Abramov et al. ................ 65/97 |
| 2002/0040892 | A1 | | 4/2002 | Koyama et al. |
| 2003/0209040 | A1 | * | 11/2003 | Hashimoto et al. ............. 65/441 |
| 2005/0160767 | A1 | * | 7/2005 | Novak .......................... 65/29.17 |

(Continued)

FOREIGN PATENT DOCUMENTS

WO 02-100787 A1 12/2002
WO 2011-066064 A2 6/2011

*Primary Examiner* — Jason L Lazorcik
(74) *Attorney, Agent, or Firm* — Kevin M. Able

(57) ABSTRACT

A thickness of at least one preselected portion of a substrate, such as glass substrate for example, is controlled. A laser beam is directed to the at least one preselected portion of the substrate in a viscous state, thereby increasing a temperature and reducing a viscosity of the at least one preselected portion of the substrate in a viscous state sufficiently to cause the at least one preselected portion of the glass substrate to attain a desired thickness. The laser beam after it is generated can be directed to a reflecting surface from which the laser beam is reflected to the at least one preselected portion of the substrate in the viscous state. The substrate can comprise a glass ribbon produced in a downdraw glass forming process for example, and the laser beam can be directed onto a plurality of preselected portions of the glass ribbon.

16 Claims, 2 Drawing Sheets

(56) References Cited

U.S. PATENT DOCUMENTS

| | | | |
|---|---|---|---|
| 2007/0140311 A1* | 6/2007 | House et al. | 374/100 |
| 2008/0037014 A1* | 2/2008 | Kuroiwa et al. | 356/239.1 |
| 2008/0198366 A1* | 8/2008 | LeBlanc | 356/73 |
| 2008/0204740 A1* | 8/2008 | Berg et al. | 356/239.2 |
| 2009/0217705 A1* | 9/2009 | Filippov et al. | 65/99.1 |
| 2009/0226733 A1 | 9/2009 | Kato et al. | |
| 2009/0237654 A1* | 9/2009 | LeBlanc | 356/239.7 |
| 2010/0051817 A1* | 3/2010 | An et al. | 250/365 |
| 2010/0126226 A1* | 5/2010 | Zhou et al. | 65/158 |
| 2010/0206006 A1* | 8/2010 | Grzybowski et al. | 65/102 |
| 2010/0258993 A1* | 10/2010 | Zhou et al. | 269/20 |
| 2010/0326138 A1 | 12/2010 | Kumatani et al. | |
| 2011/0039072 A1* | 2/2011 | Grzybowski et al. | 428/156 |
| 2011/0100058 A1* | 5/2011 | Dickinson et al. | 65/104 |
| 2011/0197634 A1* | 8/2011 | Eta | 65/97 |
| 2011/0217521 A1* | 9/2011 | Teranishi et al. | 428/189 |
| 2011/0289969 A1 | 12/2011 | Delia et al. | 65/84 |
| 2011/0302965 A1 | 12/2011 | Aniolek et al. | 65/204 |
| 2011/0317329 A1* | 12/2011 | Letz et al. | 361/321.5 |
| 2012/0047951 A1* | 3/2012 | Dannoux et al. | 65/25.3 |
| 2013/0052414 A1* | 2/2013 | Dobbins et al. | 428/141 |
| 2013/0129987 A1* | 5/2013 | Mitsugi et al. | 428/189 |
| 2013/0133367 A1* | 5/2013 | Abramov et al. | 65/53 |
| 2013/0247616 A1* | 9/2013 | Ahrens et al. | 65/29.11 |

* cited by examiner

US 8,904,822 B2

THICKNESS CONTROL OF SUBSTRATES

TECHNICAL FIELD

The present disclosure relates to methods and apparatus relating to the control of the thickness of substrates and, more particularly, to methods and apparatus relating to controlling the thickness of preselected portions of glass substrates in glass making processes.

BACKGROUND

For a variety of applications, the close control of the thickness of manufactured substrates can be important if not critical. For example, diverse procedures have been implemented and proposed for controlling thickness variations that can occur in liquid crystal display (LCD) glass manufactured by a fusion downdraw method causing variations in the thickness of the glass ribbon. Thermo-mechanical and glass flow conditions can be uneven across the entirety or portions of a width of a glass ribbon as it is being formed in the fusion downdraw method. Typically, the surface tension at the glass ribbon as it is being formed is inadequate to entirely obviate the variations that can occur in the thickness of the glass ribbon. Although the variations may be only a few microns in size, the consequences of such variations can be significant with respect to LCD glass for example. One technique for controlling thickness variations is disclosed in U.S. Pat. No. 8,196,431 to Steven R. Burdette.

SUMMARY

According to a first aspect, a method is provided of controlling a thickness of at least one preselected portion of a substrate. The method comprises generating a laser beam and directing the laser beam onto the at least one preselected portion of the substrate in a viscous state, wherein the thickness of the at least one portion of the substrate is not fixed, the laser beam possessing adequate energy to increase a temperature and reduce a viscosity of the at least one preselected portion of the substrate in a viscous state sufficiently to alter the thickness of the at least one preselected portion of the substrate, whereby the at least one preselected portion of the substrate attains a desired thickness.

In a first embodiment of the first aspect, the substrate comprises a glass substrate.

In a second embodiment of the first aspect, the substrate comprises a glass ribbon produced in a downdraw glass forming process.

In a first example of the second embodiment of the first aspect, the step of directing the laser beam onto the at least one preselected portion of the glass ribbon in a viscous state includes directing the laser beam from a laser beam generator at which the laser beam is generated to a reflecting surface from which the laser beam is reflected to the at least one preselected portion of the glass ribbon in a viscous state. According to one expression of this first example, the laser beam can be reflected onto a plurality of preselected portions of the glass ribbon in a viscous state and the plurality of preselected portions of the glass ribbon can be arranged across substantially an entire width of the glass ribbon. In the case in which the laser beam is directed onto a plurality of preselected portions of the glass ribbon in a viscous state, a respective residence time of the laser beam at each of the plurality of preselected portions of the glass ribbon in a viscous state can be selectively controlled.

In a second example of the second embodiment of the first aspect, the glass substrate comprises at least two glass layers, at least one of the two glass layers including the at least one preselected portion of the glass ribbon in a viscous state. According to one expression of this second example, the at least one preselected portion of the glass ribbon can be present at each of at least two of the at least two glass layers. A wavelength of the laser beam can be employed such that a respective amount of energy absorbed at the at least one preselected portion of the glass ribbon in a viscous state that is present at each of the at least two glass layers is adequate to increase the temperature and decrease the viscosity at the at least one preselected portion of the glass ribbon in a viscous state that is present at each of the at least two glass layers sufficiently to cause the at least one preselected portion of the glass ribbon in a viscous state that is present at each of the at least two glass layers to attain a respective desired thickness.

The first aspect can be provided alone or in combination with any one or any combination of the embodiments and examples of the first aspect discussed above.

According to a second aspect, a control apparatus is configured to control the thickness of at least one preselected portion of a substrate. The control apparatus includes a laser generator configured to generate and emit a laser beam having adequate energy to increase the temperature and decrease the viscosity of the at least one preselected portion of the substrate in a viscous state when directed onto the at least one preselected portion of the substrate in a viscous state and thereby alter the thickness of the at least one preselected portion of the substrate. The control apparatus also includes a reflecting apparatus including a reflecting surface configured to receive from the laser generator and reflect onto the at least one preselected portion of the substrate in a viscous state the laser beam generated and emitted by the laser generator. The laser generator and the reflecting apparatus are arranged in relation to the substrate such that the laser beam generated and emitted by the laser generator and reflected by the reflecting surface of the reflecting apparatus is reflected onto the at least one preselected portion of the substrate in a viscous state.

In a first embodiment of the second aspect, the control apparatus is operatively associated with a downdraw glass forming apparatus configured to produce a glass ribbon that comprises the substrate.

In a first example of the first embodiment of the second aspect, the reflecting apparatus includes a regulating mechanism configured to adjust an attitude of the reflecting surface of the reflecting apparatus with respect to receipt of the laser beam and a location of the at least one preselected portion of the glass ribbon in a viscous state, whereby the laser beam can be reflected from the reflecting surface onto the at least one preselected portion of the glass ribbon in a viscous state. According to one expression of this first example, the regulating mechanism can comprise a galvanometer. According to a second expression of this first example, the regulating mechanism can be configured to adjust, for preselected time periods, the reflecting surface of the reflecting apparatus in a plurality of varying attitudes with respect to the receipt of the laser beam and reflection of the laser beam at the reflecting surface of the reflecting apparatus. As a result, the laser beam can be directed onto a plurality of preselected portions of the glass ribbon in a viscous state for respective preselected time periods, thereby controlling the thickness of the glass ribbon at each of the preselected portions of the glass ribbon.

In a second example of the first embodiment of the second aspect, the control apparatus is located with respect to the downdraw glass forming apparatus such that the laser beam can be directed from the reflecting surface of the reflecting apparatus onto the glass ribbon at the at least one preselected portion of the glass ribbon in a viscous state adjacent to a root of a glass forming wedge of the downdraw glass forming apparatus.

The second aspect can be provided alone or in combination with any one or any combination of the embodiments and examples of the second aspect discussed above.

BRIEF DESCRIPTION OF THE DRAWINGS

The foregoing and other aspects, embodiments and examples are better understood when the following detailed description is read with reference to the accompanying drawings, in which.

DETAILED DESCRIPTION

Figure 1:
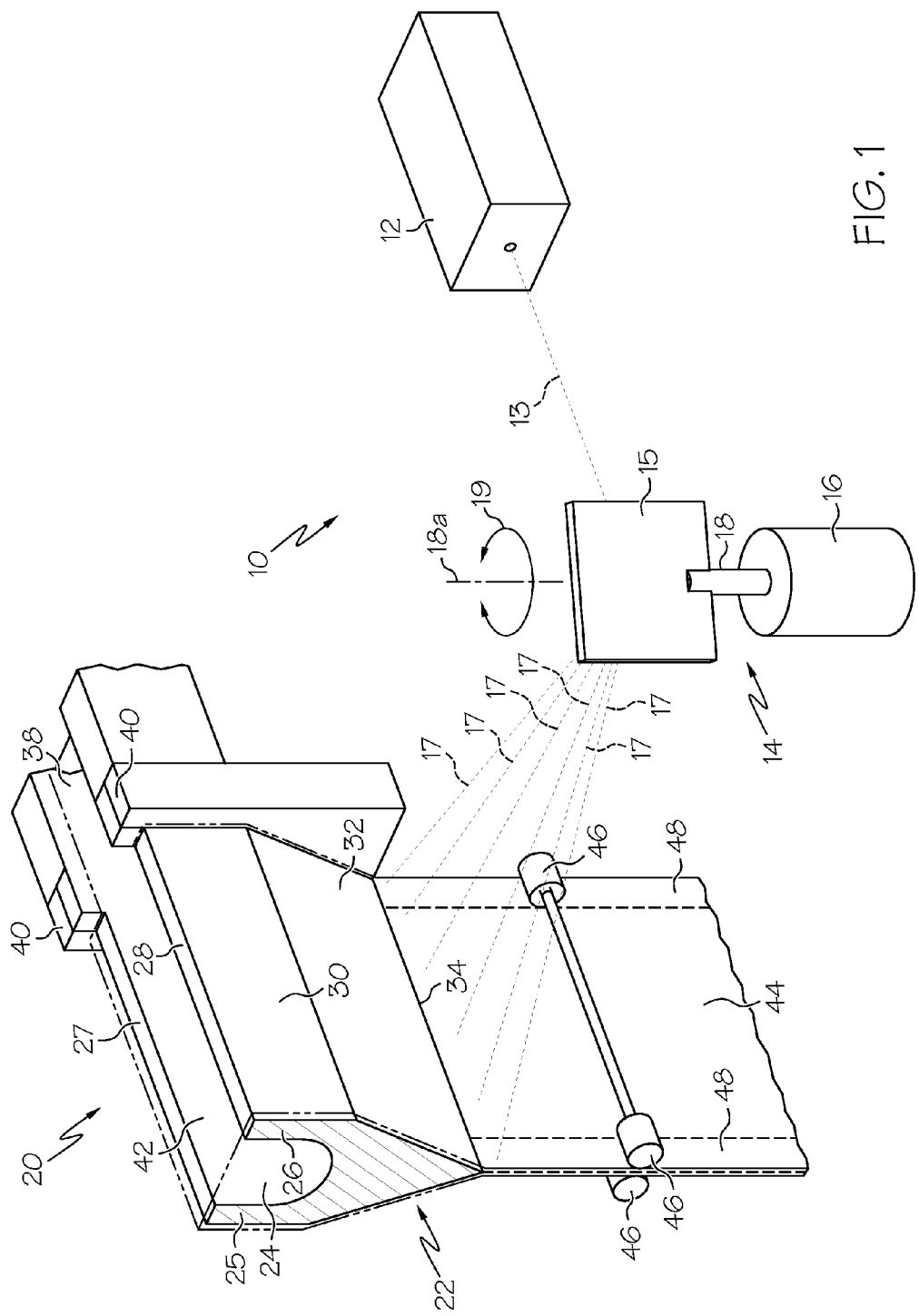
FIG. 1 is a schematic perspective view of an apparatus configured to control a thickness of at least one preselected portion of a glass substrate.

Aspects, embodiments and examples will now be described more fully hereinafter with reference to the accompanying drawings in which certain of the aspects, embodiments and examples are shown. Whenever possible, the same reference numerals are used throughout the drawings to refer to the same or like parts. It should be understood that aspects, embodiments and examples may be represented in many different forms and should not be construed as limited to the specific aspects, embodiments and examples set forth herein.

It can be the case in the production of a substrate such as a plastic or glass substrate for example that the thickness of the substrate that is produced is non-uniform. The non-uniformity can be localized, in which case the non-uniformity would be present only at a somewhat discrete portion of the substrate as viewed across the width of the substrate. On the other hand, a plurality of non-uniformities can exist, even in some cases across the entire width of the substrate.

It usually is the case in the production of a substrate, such as a plastic or glass substrate for example, that particular thickness non-uniformities in the substrate, if not corrected, will continue to be manifested as the substrate is continued to be produced. According to one aspect of the present invention, these thickness non-uniformities are identified and preselected for attention so that the non-uniformities can be essentially eliminated in the subsequently produced substrate. The correction of the thickness non-uniformities is accomplished by increasing the temperature and decreasing the viscosity of the portions of the substrate at which the non-uniformities are present, while the substrate is in a viscous state. As a result, the respective thickness of each non-uniform portion of the substrate is made uniform in the subsequently produced substrate as described in greater detail below.

A substrate is considered to be in a viscous state so long as its viscosity is such that the response of the substrate to the application of a stress is intermediate the behavior of a pure liquid and an elastic solid. Whenever the response of the substrate is that of an elastic solid, the thickness of the substrate is considered to be "fixed" as that term is used and applied herein.

The disclosures contained herein are applicable to various substrates, such as plastic and glass substrates for example, the thicknesses of which are controlled by applying corrective measures to the substrates when the substrates are in a viscous state. The drawings illustrate an aspect of apparatus and methods that can be employed for the purpose of such thickness control with respect to glass substrates. Referring to FIG. 1 of the drawings, an embodiment of a control apparatus, indicated generally at 10, that is configured to control the thickness of at least one preselected portion of a substrate is schematically illustrated. In the aspect of FIG. 1, the control apparatus 10 is shown operatively associated with an embodiment of a downdraw glass forming apparatus, indicated generally at 20, that is configured to produce a glass ribbon 44. Downdraw glass forming processes for manufacturing glass substrates such as the glass ribbon 44 and employing equipment such as the downdraw glass forming apparatus 20 are sometimes referred to as fusion processes, overflow processes or overflow downdraw processes. The schematic representations of the control apparatus 10 and the downdraw glass forming apparatus 20 are referred to herein with respect to the descriptions to follow of aspects, embodiments and examples of methods and apparatus that concern the control of the thickness of a glass substrate such as the glass ribbon 44 for example.

Included in the embodiment of the downdraw glass forming apparatus 20 illustrated in FIG. 1 is a forming wedge 22 that includes an open channel 24 that is bounded on its longitudinal sides by walls 25 and 26. The walls 25 and 26 terminate at their upper extent in opposed longitudinally-extending overflow weirs 27 and 28, respectively. The overflow weirs 27 and 28 are integral with a pair of opposed substantially vertical forming surfaces 30 that, in turn, are integral with a pair of opposed downwardly inclined converging forming surfaces 32. The pair of downwardly inclined converging surfaces 32 terminate at a substantially horizontal lower apex that comprises a root 34 of the forming wedge 22. Molten glass is delivered into open channel 24 by means of a delivery passage 38 that is in fluid communication with the open channel 24. A pair of dams 40 are provided above overflow weirs 27 and 28 adjacent each end of open channel 24 to direct the overflow of the free surface 42 of molten glass over overflow weirs 27 and 28 as separate flows of molten glass. Only the pair of dams 40 that are located at the end of the open channel 24 that is adjacent the delivery passage 38 are shown in FIG. 1. The separate flows of molten glass flow down over the pair of opposed substantially vertical forming surfaces 30 and the pair of opposed downwardly inclined converging forming surfaces 32 to the root 34 where the separate flows of molten glass, shown in broken lines in FIG. 1, converge to form the glass ribbon 44. At approximately this point the glass ribbon is in a viscous state and the thickness of the glass ribbon 44 has not become fixed so that the thickness of the glass ribbon can be altered according to the aspects described herein.

Pulling rolls 46 are located downstream of the root 34 of the forming wedge 22 and engage side edges 48 at both sides of the glass ribbon 44 so as to apply tension to the glass ribbon. The pulling rolls 46 are positioned sufficiently below the root 34 that the thickness of the glass ribbon 44 is essentially fixed at that location. The pulling rolls 46 draw the glass ribbon 44 downwardly at a prescribed rate that establishes the thickness of the glass ribbon as it is formed at the root 34.

In the aspect illustrated in FIG. 1, the control apparatus 10 includes a laser generator 12 that is configured to generate and emit a laser beam 13 adequate to increase the temperature and decrease the viscosity of at least one preselected portion of a glass substrate in a viscous state, such as the glass ribbon 44 in a viscous state for example, when the laser beam 13 is directed onto the at least one preselected portion of the glass substrate in a viscous state and thereby alter the thickness of the at least one preselected portion of the glass substrate. As illustrated in the aspect of FIG. 1, the laser beam 13 is directed to the glass ribbon 44 at a location adjacent the root 34 of the forming wedge 22 where the glass ribbon is in a viscous state. However, the laser beam 13 can be directed to the glass ribbon 44 at other locations where the glass ribbon is in a viscous state.

In one aspect, and depending on the characteristics of the glass substrate, the viscosity of the glass substrate in a viscous state would be greater than approximately 100,000 poise but not so great that the thickness of the substrate would be fixed. At viscosities greater than approximately 100,000 poise but less than the viscosity of the glass substrate when the thickness is fixed, the application of heat to the glass substrate effectively decreases the viscosity of the glass substrate at the point at which the heat is applied, and the heat is not dissipated in the glass substrate as would occur at lower substrate viscosities.

The adequacy of a laser beam for the purpose of increasing the temperature and decreasing the viscosity of at least one preselected portion of a glass ribbon is a function primarily of the characteristics of the glass ribbon in a viscous state, the wavelength and the power level of the laser beam and whether an objective is to alter the thickness of a limited or a large number of preselected portions of the glass substrate. For example, according to one aspect, where the glass substrate comprises a single layer, the wave length of the laser beam is selected so that the laser beam is substantially absorbed by the glass substrate and does not readily pass through the glass substrate. According to another aspect, for example, if the thickness of only a single portion of a few millimeters of a single layer of the glass substrate is to be controlled and the laser beam is relatively stationary and fixed on the single portion of the glass substrate in a viscous state, the power of the laser beam can be lower than the power used if the thicknesses of a plurality of portions of the glass substrate are to be controlled and the laser beam must continuously and rapidly sweep over the plurality of portions. Additionally, if the cycle rate of the laser is greater than approximately 50 Hz or so, the laser can be pulsed or continuous.

The laser generator 12, as an example, can comprise a high-intensity infrared laser generator such as a carbon dioxide ($CO_2$) laser generator of a type that is available from numerous commercial sources. The wavelengths of the light produced and the power generated by $CO_2$ laser generators are variable and can be selected so that the laser beam generated is adequate to increase the temperature and decrease the viscosity of at least one preselected portion of a glass substrate in a viscous state, such as the glass ribbon 44, sufficiently to correct thickness variations present in the glass substrate. For example, a laser beam with a wavelength of between approximately 9.4 micrometers and approximately 10.6 micrometers and a power output of thousands of watts can be suitable for increasing the temperature and decreasing the viscosity of at least one preselected portion of a glass substrate in a viscous state such as the glass ribbon 44. However, because differing glass substrates will absorb laser beams to differing degrees at differing wavelengths, wavelengths outside the range of approximately 9.4 micrometers to approximately 10.6 micrometers can be employed.

The control apparatus 10 in the aspect illustrated in FIG. 1 can also include a reflecting apparatus, indicated generally at 14, including a reflecting surface 15 that is configured to receive from the laser generator 12 and reflect onto at least one preselected portion of the glass substrate, such as the glass ribbon 44 for example, the laser beam 13 generated and emitted by the laser generator 12. The reflecting apparatus can therefore function as a beam-steering and/or scanning device. In FIG. 1, the laser beam 13 is illustrated as being advanced as reflected laser beams 17 to a plurality of preselected portions of the glass ribbon 44 in a viscous state as a result of incremental adjustments of the attitude of the reflecting surface 15 made with respect to the receipt of the laser beam 13 by the reflecting surface 15 and the locations of the preselected portions of the glass ribbon 44 in a viscous state as described in greater detail below. It is noted here, however, that thickness variations that can occur with respect to glass substrates, such as a glass substrate that is suitable for use as LCD glass, can exist in only a very small area and, therefore, be localized. Because the laser beam spot striking the glass substrate also is very small, localized thickness variations can be addressed without affecting immediately adjacent portions of the glass substrate. Thus, the laser beams can provide localized heating at high spatial resolutions.

The reflecting surface 15 in one example can comprise a gold-coated mirror although other types of mirrors may be used in other examples. Gold-coated mirrors may be desirable under certain applications for the purpose of providing superior and consistent reflectivity with respect to infrared lasers. In addition, the reflectivity of the gold-coated mirrors is virtually independent of the angle of incidence, and, therefore, the gold-coated mirrors are particularly useful as scanning or laser beam-steering mirrors.

The reflecting apparatus 14 in the embodiment illustrated in FIG. 1 also includes a regulating mechanism 16 configured to adjust an attitude of the reflecting surface 15 of the reflecting apparatus 14 with respect to the receipt of the laser beam 13 and a location of the at least one preselected portion of the glass substrate in a viscous state, such as the glass ribbon 44 for example. Thereby, the laser beam 13 can be reflected as reflected laser beams 17 from the reflecting surface 15 onto the at least one preselected portion of the glass substrate. According to one example, the regulating mechanism 16 can comprise a galvanometer that is operatively associated with the reflecting surface 15 so that the reflecting surface 15 can be rotated by the galvanometer along an axis in relation to the glass ribbon 44. For example, the reflecting surface 15 can be mounted on a rotating shaft 18 that is driven by a galvanometer motor and rotated about axis 18a as shown by double arrow 19.

As illustrated in the embodiment of FIG. 1, the reflecting apparatus 14 is located with respect to the downdraw glass forming apparatus 20 such that the laser beam 13 can be directed from the reflecting surface 15 of the reflecting apparatus 14 onto at least one preselected portion of the glass ribbon 44 in a viscous state prior to the thickness of the at least one preselected portion of the glass ribbon becoming fixed. In the embodiment of FIG. 1, the reflected laser beams 17 are directed to the glass substrate substantially adjacent the root 34 of the forming wedge 22, at which location the separate flows of molten glass have converged to form the glass ribbon 44 in a viscous state, but at which location the thickness of the glass ribbon has not yet been fixed. However, the reflected laser beams 17 need not be directed to the glass ribbon 44 substantially adjacent the root 34 and can be directed to the glass ribbon at any location at which the glass ribbon is in a viscous state. By increasing the temperature and reducing the viscosity of a preselected portion of the glass substrate at a location at which the preselected portion of the glass substrate is in a viscous state and its thickness has not been fixed, the preselected portion of the glass substrate will tend to flow, under the influence, for example, of thermo-mechanical and other forces present at the preselected portion of the glass substrate, so that the thickness of the preselected portion of the glass substrate will become substantially uniform at that preselected portion of the glass substrate.

As will be understood by those having ordinary skill in the art, the downdraw glass forming apparatus 20 illustrated in FIG. 1 is typically contained within enclosures, not shown, to control the thermal environment of the glass ribbon 44. There also will be enclosures, not shown, provided at the location of the pulling rolls 46 also for controlling the thermal environment of the glass ribbon. However, the control apparatus 20 can be located just below the enclosures for the downdraw glass forming apparatus 20 and above the enclosures for the pulling rolls 46. In any event, the laser generator 12 and the reflecting apparatus 14 are arranged in relation to the substrate or glass ribbon 44 such that the laser beam 13 generated and emitted by the laser generator 12 and reflected by the reflecting surface 15 of the reflecting apparatus 14 is reflected onto the at least one preselected portion of the glass ribbon 44 at a location at which the glass ribbon is in a viscous state.

Based on the foregoing description, it will be understood that, according to one aspect, a method is provided of controlling a thickness of at least one preselected portion of a substrate, such as a glass ribbon 44 for example. The method can comprise generating a laser beam and directing the laser beam onto the at least one preselected portion of the substrate in a viscous state, wherein the thickness of the at least one portion of the substrate is not fixed. The laser beam would possess adequate energy to increase a temperature and reduce a viscosity of the at least one preselected portion of the substrate in a viscous state sufficiently to alter the thickness of the at least one preselected portion of the substrate. Consequently, the at least one preselected portion of the substrate can be caused to attain a desired thickness.

According to another aspect, the step of directing the laser beam onto the at least one preselected portion of the substrate in a viscous state includes directing the laser beam from a laser beam generator, at which the laser beam is generated, to a reflecting surface from which the laser beam is reflected to the at least one preselected portion of the substrate in a viscous state. In both these aspects, the laser beam can be directed onto a plurality of preselected portions of the substrate in the viscous state and the plurality of preselected portions of the substrate can be arranged across an entire width of the substrate as shown in FIG. 1 for example with respect to the glass ribbon 44. In addition, as described below in greater detail, in an example embodiment, the residence time of the laser beam at each of the plurality of preselected portions of the substrate in a viscous state can be selectively controlled. In examples of all these aspects, the substrate can comprise a glass ribbon produced in a downdraw glass forming process such as the glass ribbon 44.

Figure 2:
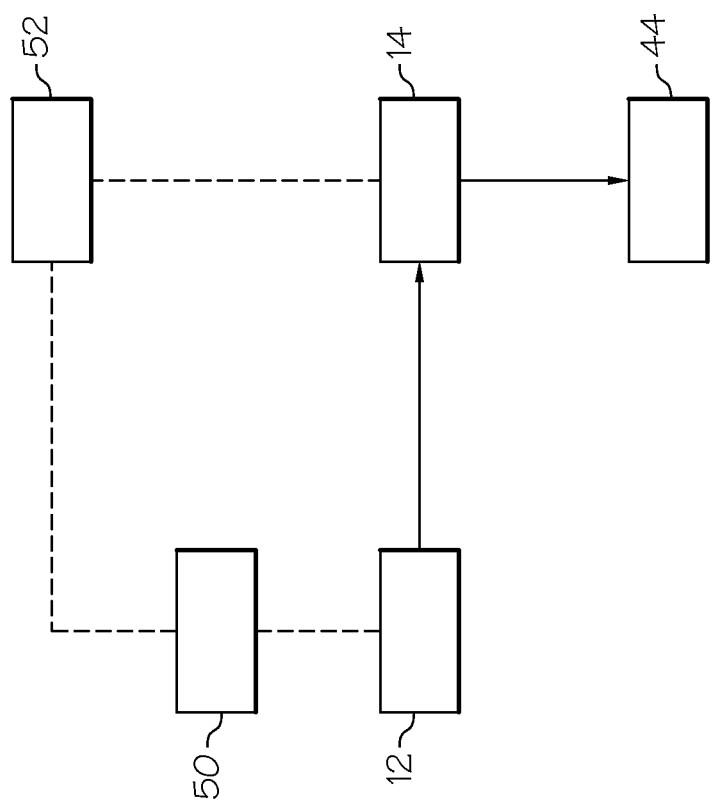
FIG. 2 is a block diagram that illustrates an aspect of apparatus applied to methods and apparatus of controlling a thickness of at least one preselected portion of a glass substrate.

FIG. 2 comprises a block diagram that illustrates an aspect of an operating apparatus that functions in cooperation with the control apparatus 10, wherein solid lines with an arrow represent laser beams and dashed lines represent electrical control signals. A laser power control unit 50 controls the operation of the laser generator 12 so that the wavelength and the power of the laser beam 13 generated at the laser generator 12 will comprise preselected values. In addition, the laser power control unit 50 can control the time intervals during which the laser generator 12 generates the laser beam 13. In turn, a control computer 52 is provided to appropriately control the operation of the laser power control unit 50 whereby the laser power control unit 50 will cause the laser generator 12 to generate during preselected time intervals a laser beam 13 having preselected wavelength and power characteristics.

At the same time, the control computer 52 is operatively associated with the reflecting apparatus 14 so as to control the functioning of the regulating mechanism 16, and in a particular example where a galvanometer is employed, the motor of the galvanometer. Accordingly, the control computer 52 is capable of adjusting the attitude and positioning of the reflecting surface 15 with respect to the receipt of the laser beam 13 by the reflecting surface and the locations of the preselected portions of the glass substrate in a viscous state for which the thicknesses are to be controlled.

It will be understood based on the aspects, embodiments and examples described above with reference to FIG. 1 and FIG. 2 that, according to an example embodiment, the regulating mechanism 16 can be configured to adjust for preselected time periods the reflecting surface 15 of the reflecting apparatus 14 in a plurality of varying attitudes with respect to the receipt of the laser beam 13 and the reflection of the laser beam at the reflecting surface 15 of the reflecting apparatus 14. As a consequence, the laser beam 13 can be directed onto a plurality of preselected portions of the glass ribbon 44 in a viscous state across a width of the glass substrate for respective preselected time periods, as illustrated by the reflected laser beams 17 in FIG. 1 for example, thereby controlling the thickness of the glass substrate at each of the preselected portions. More particularly, with reference to the aspect illustrated in FIG. 2, the control computer 52 can be programmed so as to cause the regulating mechanism 16 to control the attitude of the reflecting surface 15 in a manner such that the reflected laser beams 17 are directed to preselected portions of the glass ribbon 44 for preselected time periods that can vary in the event, for example, that it has been determined based on experience or otherwise that the thicknesses of the preselected portions of the glass ribbon are required to be controlled to varying extents.

The non-uniformities in thickness that can occur in connection with the production of substrates such as the glass ribbon 44 for example can arise in various contexts. For example, a non-uniformity can be present at a single localized portion of the substrate and that non-uniformity can exist with respect to the thicknesses of adjacent portions of the substrate or with respect to the single localized portion of the substrate itself. In either event, it is only necessary to provide for the reflecting apparatus 14 to continuously reflect to that single portion of the substrate in a viscous state the laser beam 13 at a suitable energy level and wavelength for the purpose of causing the thickness of the single portion of the substrate to attain a desired thickness in the finally produced substrate. This is accomplished by programming the computer 52 to cause the regulating mechanism 16 of the reflecting apparatus 14 to control the attitude and positioning of the reflecting surface 15 of the regulating mechanism 16 and to cause the power control unit 50 to control the energy level and wavelength of the laser beam 13 produced by the laser generator 12. By way of further example, there can exist in the substrate two or more distinct portions in which thickness non-uniformities exist. In that case, the computer 52 can be programmed so as to cause the regulating mechanism 16 of the reflecting apparatus 14 to control the attitude and positioning of the reflecting surface 15 such that the reflected beam 17 continuously is placed in contact with the two or more portions of the substrate at which the non-uniformities exist. Also, the computer is programmed to cause the power control unit 50 to control the energy level and wavelength of the laser beam 13 produced by the laser generator 12 so that the thicknesses at those two or more portions are caused to be altered whereby they attain respective desired thicknesses in the finally produced substrate. In addition, the computer 52 can be programmed so as to cause the reflected beam 17, through the operation of the regulating mechanism 16, to reside at each of the two or more non-uniform portions of the substrate for the necessary periods of time to adequately decrease the viscosity of each of the portions so that the thicknesses of the non-uniform portions can be suitably altered. Also by way of example, the non-uniformities in thickness that are present in the substrate can range across the entirety of the substrate, including any beads that are present at the side edges 48 of the glass ribbon 44. Again, the computer 52 can be programmed appropriately to cause the laser generator 12, through the control of the power control unit 50, to provide a laser beam 13 of an appropriate strength and wavelength and to cause the laser beam 13, through the instrumentality of the reflecting apparatus 14, to continuously sweep back and forth across the substrate while residing at the portions of the substrate at which the thickness corrections are to be made for the periods of time required to decrease the viscosities of these portions of substrate to levels that result in the attainment of the respective desired thicknesses at these portions of the substrate as the substrate is produced.

The development of the information and data required to appropriately program the computer 52 can be accomplished in various ways. For example, a thickness measurement trace can be carried out on the substrate that has been produced for the purpose of identifying thickness non-uniformities that are present in the substrate. The computer 52 can then be programmed appropriately based on that measurement trace. Also by way of example, the thickness profile of the substrate can be monitored in real time as the substrate is produced and the information developed by that monitoring can be fed back to the computer 52 so that the computer, pursuant to an appropriate closed-loop control algorithm, can cause adjustments to the reflecting apparatus 14 and the laser power control unit 50 to cause the portions of the substrate that exhibit thickness non-uniformities to attain the desired thicknesses.

According to an additional aspect, a glass substrate, such as the glass ribbon 44, can comprise at least two glass layers, with at least one of the glass layers including at least one preselected portion of the glass substrate in a viscous state. In the case in which the at least one preselected portion is present at each of at least two of the at least two glass layers, the wavelength of the laser beam employed is such that a respective amount of energy absorbed at the at least one preselected portion of the glass substrate in a viscous state that is present at each of the at least two glass layers is adequate to increase the temperature and decrease the viscosity at the at least one preselected portion of the glass substrate that is present at each of the at least two glass layers sufficiently to cause the at least one preselected portion of the glass ribbon that is present at each of the at least two glass layers to attain a respective desired thickness. The extent to which the laser beam is absorbed and transmitted at each of the glass layers depends, and consequently the extents to which the preselected potions of the glass substrate in a viscous state are heated and their viscosities decreased depend, not only on the characteristics of the glass layers but also on the wavelength of the laser beam. Therefore, laser beam wavelengths can be selected that, depending on the characteristics of the glass layers, will allow the laser beams to reach all preselected portions of the two or more glass layers, the thicknesses of which are to be altered. The result will be that the preselected portions of the substrate will be differentially heated as required to decrease the viscosities of the preselected portions of the glass substrate sufficiently to alter the thicknesses of the preselected portions, whereby they attain the desired thicknesses.

It will be apparent to those skilled in the art that various modifications and variations can be made without departing from the spirit and scope of the claims set forth below. For example, the various aspects, embodiments and examples described herein can be applied to glass substrates produced by other glass forming processes such as slot draw, updraw and float processes for example.

What is claimed is:

1. A method of controlling a thickness between a first major surface and a second major surface of at least one preselected portion of a glass or plastic substrate comprising:

providing a molten glass or plastic material;

forming the molten glass or plastic material into a ribbon, the forming comprising applying a tension to edge portions of the ribbon;

monitoring a thickness of the ribbon;

identifying at least one thickness non-uniformity in the ribbon;

preselecting at least one portion of the substrate in a viscous state corresponding to the identified thickness non-uniformity; and heating the at least one preselected portion of the ribbon in the viscous state with a laser beam directed to impinge on the preselected portion, wherein the heating causes the at least one preselected portion of the ribbon to attain a predetermined thickness, the heating comprising controlling at least one of a power, a residence time or a wavelength of the laser beam impinging on the preselected portion in response to the monitored thickness.

2. The method of claim 1, wherein the heating comprises directing the laser beam from a laser beam generator, at which the laser beam is generated, to a reflecting surface from which the laser beam is reflected to the at least one preselected portion of the ribbon in the viscous state.

3. The method of claim 1, wherein the laser beam is directed onto a plurality of preselected portions of the ribbon in the viscous state.

4. The method of claim 3, wherein the plurality of preselected portions of the ribbon in the viscous state are arranged across substantially an entire width of the ribbon.

5. The method of claim 3, including selectively controlling at least one of the power, the residence time or the wavelength of the laser beam at each of the plurality of preselected portions of the ribbon in the viscous state.

6. The method of claim 1, wherein the laser beam is substantially absorbed by the ribbon and does not readily pass through the ribbon.

7. A method of controlling a thickness of at least one preselected portion of a glass ribbon comprising:

drawing the glass ribbon from a quantity of glass, the glass ribbon further comprising at least two glass layers;

identifying at least one thickness non-uniformity in the glass ribbon;

preselecting at least one portion of the glass ribbon in a viscous state corresponding to the identified thickness non-uniformity, wherein at least one of the two glass layers includes the at least one preselected portion of the glass ribbon in the viscous state and the at least one preselected portion of the glass ribbon in the viscous state is present at each of at least two of the at least two glass layers;

generating a laser beam; and directing the laser beam onto the at least one preselected portion of the glass ribbon in the viscous state, wherein the thickness of the at least one preselected portion of the glass ribbon in the viscous state is not fixed, and a wavelength of the laser beam is such that a respective amount of energy absorbed at the at least one preselected portion of the glass ribbon in the viscous state that is present at each of the at least two glass layers is adequate to increase the temperature and decrease the viscosity at the at least one preselected portion of the glass ribbon in the viscous state that is present at each of the at least two glass layers sufficiently to cause the at least one preselected portion of the glass ribbon in the viscous state that is present at each of the at least two glass layers to attain a respective desired thickness.

8. The method of claim 7, wherein the step of drawing includes drawing the glass ribbon from a root of a forming wedge.

9. The method of claim 8, wherein the preselected portion in the viscous state is located substantially adjacent the root of the forming wedge.

10. The method of claim 7, wherein the laser beam is substantially absorbed by the glass ribbon and does not readily pass through the glass ribbon.

11. The method of claim 7, wherein the identifying comprises monitoring a thickness of the glass ribbon.

12. The method of claim 11, wherein the monitoring is carried out in real time while drawing the glass ribbon.

13. The method of claim 7, wherein the step of directing the laser beam includes directing the laser beam from a laser beam generator, at which the laser beam is generated, to a reflecting surface from which the laser beam is reflected to the at least one preselected portion of the glass ribbon in the viscous state.

14. The method of claim 7, wherein the laser beam is directed onto a plurality of preselected portions of the glass ribbon in the viscous state.

15. The method of claim 14, wherein the plurality of preselected portions of the glass ribbon in the viscous state are arranged across substantially an entire width of the glass ribbon.

16. The method of claim 14, including selectively controlling a respective residence time of the laser beam at each of the plurality of preselected portions of the glass ribbon in the viscous state.

* * * * *